United States Patent [19]

Hosoya et al.

[11] Patent Number: 5,428,455
[45] Date of Patent: Jun. 27, 1995

[54] APPARATUS FOR REDUCING NOISE IN HIGH-FREQUENCY BAND

[75] Inventors: Nobukazu Hosoya, Nara; Tooru Sasaki, Osaka, both of Japan

[73] Assignee: Sanyo Electric Co., Ltd., Osaka, Japan

[21] Appl. No.: 467,076

[22] Filed: Jan. 18, 1990

[30] Foreign Application Priority Data

Jan. 19, 1989 [JP] Japan .................................. 1-10224

[51] Int. Cl.$^6$ .............................................. H04N 5/76
[52] U.S. Cl. ..................................... 358/340; 358/330; 358/328; 348/607; 369/59
[58] Field of Search ............... 358/330, 167, 166, 340, 358/328, 316, 36, 315, 320, 327, 336, 337, 342, 343; 360/24, 65, 68, 25, 33.1, 19.1; 369/59; 455/308, 295, 309, 296

[56] References Cited

U.S. PATENT DOCUMENTS

| | | | |
|---|---|---|---|
| 4,042,883 | 8/1977 | Rae | 325/477 |
| 4,119,812 | 10/1978 | Fox | 179/100.4 D |
| 4,256,975 | 3/1981 | Fukushima et al. | 455/309 |
| 4,363,138 | 12/1982 | Franklin et al. | 455/226 |
| 4,366,564 | 12/1982 | de Haan et al. | 369/48 |
| 4,577,238 | 3/1886 | Watanabe | 358/340 |

OTHER PUBLICATIONS

Patent Abstracts of Japan, vol. 6, No. 186, JP-A-57 93 787.
"Laser Disc Technical Book", Kabushiki Kaisha AS-CII, Nov. 1, 1986, pp. 55-60.

*Primary Examiner*—Tommy P. Chin
*Assistant Examiner*—Robert Chevalier
*Attorney, Agent, or Firm*—Armstrong, Westerman, Hattori, McLeland & Naughton

[57] ABSTRACT

An apparatus for reducing noise in the high-frequency band is provided in the preceding stage of a limiter (8) with a high-frequency band correcting filter (12) for reducing a high-frequency band component of a reproduced RF signal from an optical disc. The reproduced RF signal has its high-frequency component lowered before entered into the limiter (18), reducing noise and beat components. As a result, a signal which is less influenced by the noise and beat and has good S/N can be obtained.

5 Claims, 13 Drawing Sheets

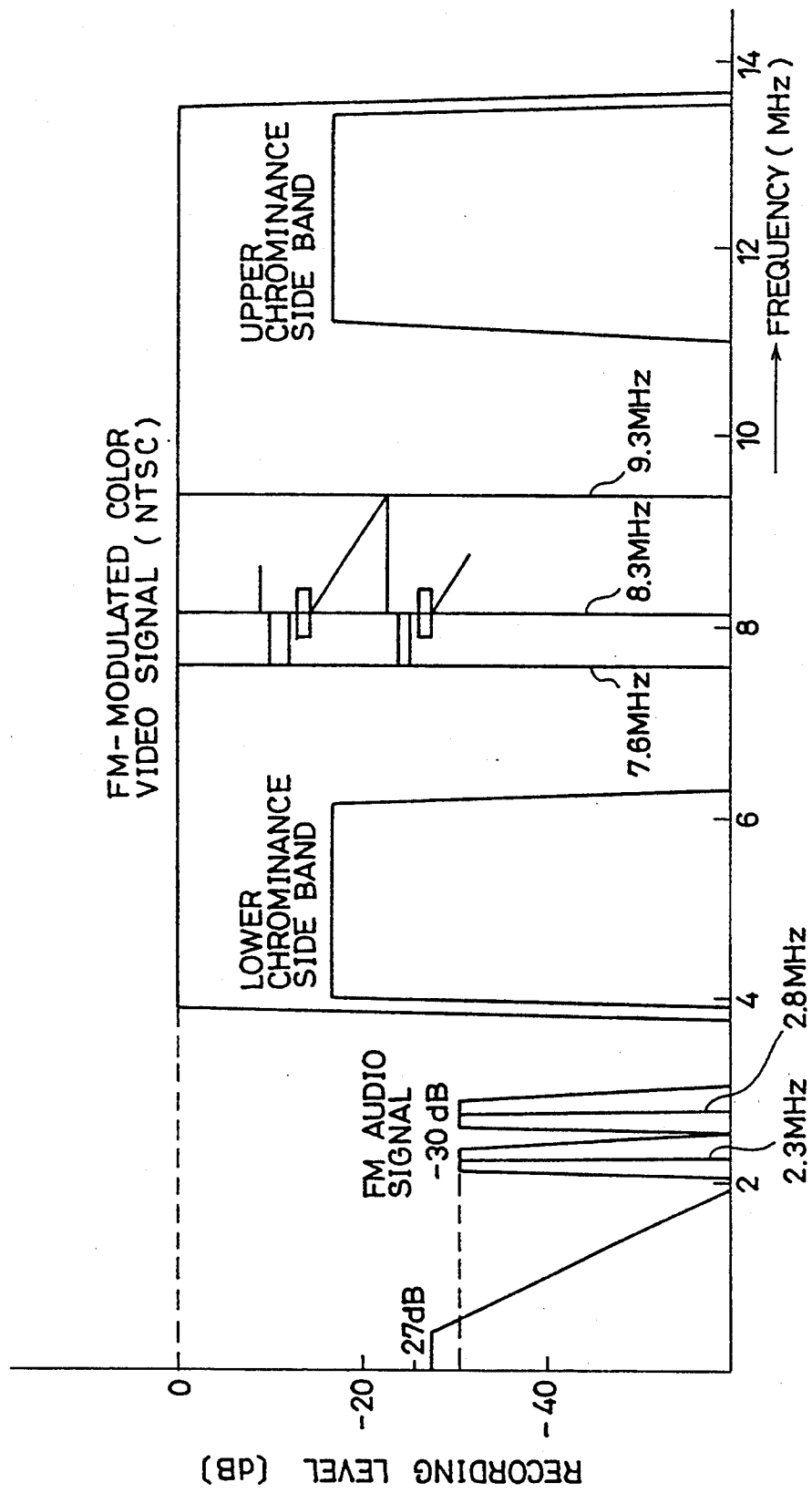

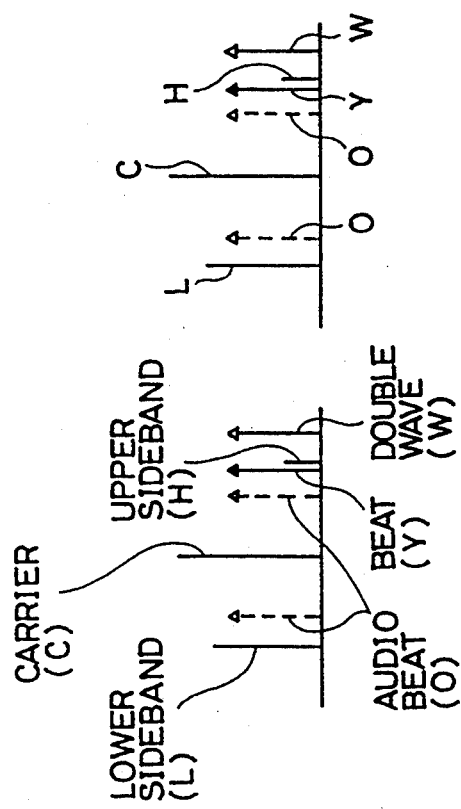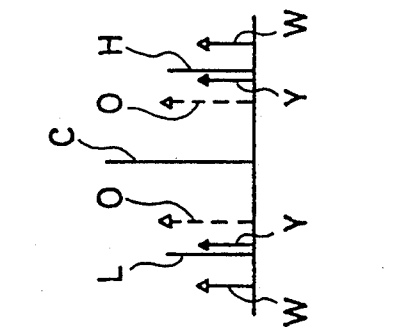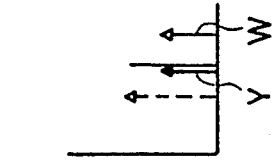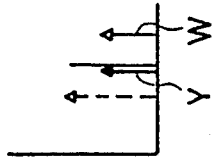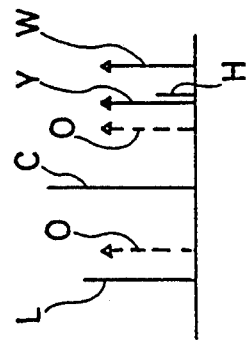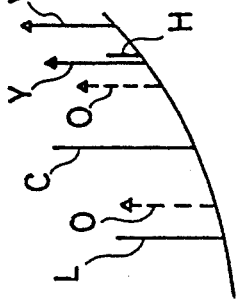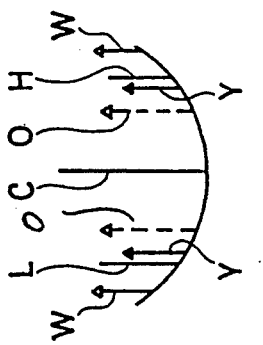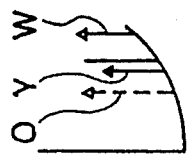

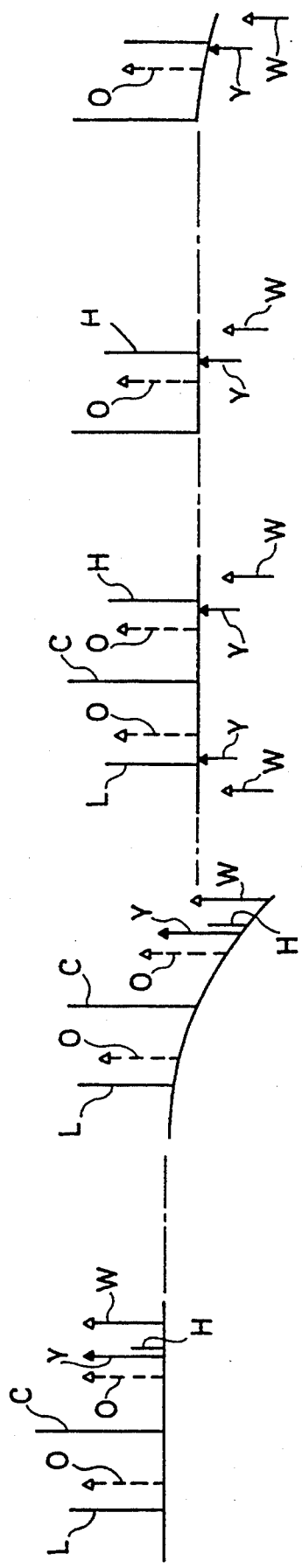

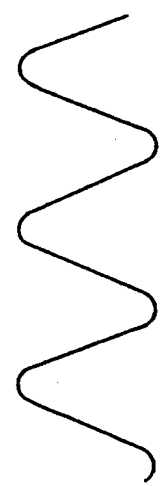
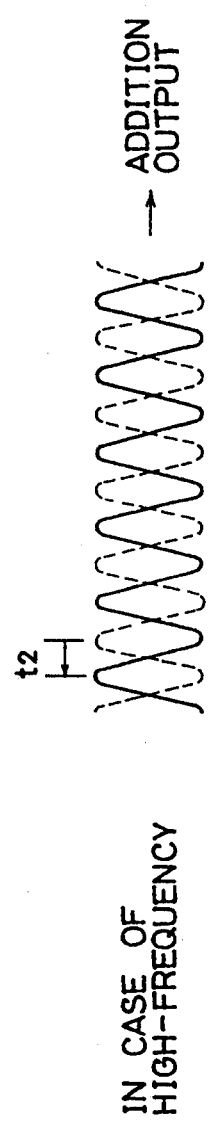
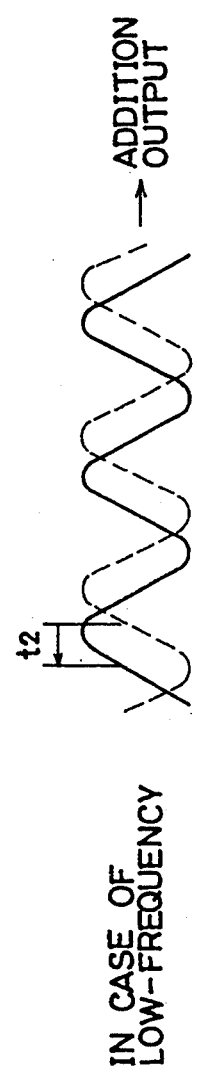

APPARATUS FOR REDUCING NOISE IN HIGH-FREQUENCY BAND

CROSS-REFERENCE TO RELATED APPLICATION

The present application is related to co-pending application Ser. No. 321,821, filed 10th March, 1989, commonly assigned to the assignee of the present application.

BACKGROUND OF THE INVENTION

1. Field of the Invention

The present invention generally relates to apparatuses for and methods of reducing noise in high-frequency band, and more particularly, to an apparatus and a method which are employed in an optical video disc player for correcting frequency distribution caused by a pickup and transmission distortion.

2. Description of the Background Art

One of the existing optical video disk players for optically reproducing an NTSC color video signal optically recorded on a video disk record is disclosed at large in "Laser Disc Technical Book" issued 1st Nov. 1986 by Kabushiki Kaisha ASCII.

As shown in frequency spectrums of FIGS. 1 and 2A, on that optical video disc record, there is recorded a modulated video signal with an FM deviation area, an upper sideband and a lower sideband in the range of 4 MHz to 13.5 MHz which has been obtained by FM-modulating the NTSC color video signal to have a sink tip of 7.6 MHz, a pedestal level of 8.3 MHz and a white peak of 9.3 MHz. On this optic video disc record, there are also recorded a 2.3 MHz carrier and a 2.8 MHz carrier that never fail to have been FM-modulated by audio signals on two channels. Additionally, on a low-frequency side of the FM audio signal, there is recorded in a frequency multiplexing manner a digital audio signal with a format identical to that of a compact disc record.

While recently, there exists an increasing demand for a fine-pitch image, in order to meet that demand with the present rotating speed and thus central frequency of a disc unchanged, expansion of the video signal in frequency band is required. For this purpose of expanding the video signal in band, three methods can be proposed as shown in FIGS. 2B to 2D.

FIG. 2B shows a method (first method) of expanding both the low- and high-frequency bands by eliminating the FM audio signal. FIG. 2C shows another method (second method) of expanding only the high-frequency band and doubling energy thereof while maintaining the FM audio signal in the present state. FIG. 2D shows still another method (third method) of expanding only the low-frequency band and doubling energy thereof by eliminating the FM audio signal. According to the second and third methods, only the high-frequency band or the low-frequency band is to be doubled in energy, so that video signal processing at RF stage in recording on a disc becomes more complicated than that in the first method. Therefore, implementation of a filter having such frequency characteristics as shown in FIGS. 2C and 2D is impossible in terms of technology. Consequently, it is most desirable in general to implement a fine-pitch image by employing the first method.

Meanwhile, when optical reproduction of the signal is made with the use of a conventional pickup, a spot of laser beam which is larger than a pit width on the disc reduces resolution of signal detection, resulting in a deteriorated high-frequency band component of the reproduced RF signal as shown in FIG. 3. In a CAV (Constant Angular Velocity) disc operative at a constant angular velocity, such a tendency becomes more evident with a position closer to the inner circumference of the disc and a higher frequency. In the CAV disc, linear velocity varies from 10.75 m/s to 32 m/s between the inner circumference and the outer circumference. Therefore, even with signals of the same pit length, length of a signal detected in the outer circumference per unit time is larger than that in the inner circumference. Length of a signal detected in the outer-most circumference per unit time is three times as large as that in the inner-most circumference. Accordingly, the high-frequency band component of a reproduced RF signal is degraded more considerably in a position closer to the inner circumference of the CAV disc.

Meanwhile, in a CLV (Constant Linear Velocity) disc operative at a constant liner velocity, the same degradation of the high-frequency band as seen in the inner circumference of the CAV disc appears in the full circumference.

As described above, since the RF signal obtained through a pickup entails considerable degradation of frequency characteristics in the high-frequency band, a method disclosed in pp. 77 to 79 of the above-mentioned "Laser Disc Technical Book" has been hitherto employed. This method is shown in FIG. 4. Referring to FIG. 4, an RF signal having been detected by a pickup 31 is amplified by a preamplifier 32. In order to correct the degradation of frequency characteristics in the high-frequency band, a high-frequency band amplification correcting circuit 33 is interposed between the preamplifier 32 and a limiter 34. The high-frequency band amplification correcting circuit 33 corrects high-frequency band amplification by raising the high-frequency band component of the RF signal. An output signal of the limiter 34 is demodulated into a color video signal by an FM demodulating circuit 35.

Such correction of the high-frequency band amplification as described above has, however, the following problems. As mentioned above, frequency distribution of a recorded signal in a conventional optical video disc is shown in FIG. 2A. Since in recording, the FM-modulated signal is passed through the limiter, the reproduced RF signal contains a double wave and a triple wave as shown in FIG. 5. Furthermore, distortion in a transmission system and a circuit system also causes the double wave through the pickup. Such a double wave may possibly overlap the high-frequency band of a basic wave as shown in FIG. 5. Particularly, in case of a fine-pitch video disc record which has a video signal band expanded in both the low- and high-frequency bands in frequency distribution of a recorded signal as shown in FIG. 2B, expansion of signal waves is equal to that of conventional signal waves plus hatched portions in FIG. 5. As a result, overlap of the basic wave and the second wave becomes more apparent. If such a signal is detected, or FM-demodulated without any processing in reproduction, then such overlap appears on an image plane as beat or noise.

Furthermore, since resolution of signal detection is low in the inner circumference of the CAV disc or in the full circumference of the CLV disc, it is inherently hard for the high-frequency band component to appear in reproduction. Such correction as made by raising this high-frequency band component may deteriorate S/N, so that picture quality is rather deteriorated.

Subsequently, signals with degraded high-frequency band components as will be obtained from the inner circumference of the CAV disc or the full circumference of the CLV disc will be described in detail with reference to FIGS. 6A to 6D and 7A to 7D.

FIGS. 6A to 6D show frequency spectra of RF signals which are not corrected for the high-frequency band amplification. As shown in FIG. 6A, the RF signal is degraded in the high-frequency band including a carrier C. When such an RF signal is passed through the limiter, as shown in FIG. 6C, an upper sideband component H and a lower sideband component L are averaged before output. While ratio of the carrier to the sidebands remains substantially unchanged, a double wave W and a beat Y caused by overlap of the double wave and the basic wave, which have been seen only in the high-frequency band, are average. Therefore, when an output signal of the limiter is FM-demodulated, beat and noise are generated in the high-frequency band as shown in FIG. 6D.

FIGS. 7A to 7B show frequency spectra of RF signals which are corrected for the high-frequency band amplification. Likewise in FIG. 6A, the RF signal shown in FIG. 7A is corrected by the high-frequency band amplification correcting circuit 33 such that the high-frequency band component is raised. This also causes the beat Y which have been seen only in the high-frequency band to be amplified. Thereafter, the RF signal is passed through the limiter 34 so that both the noise and the beat are amplified as shown in FIG. 7C. FM-demodulation of such an RF signal will result in degradation of S/N and amplification of beat in the high-frequency band.

Meanwhile, in FIGS. 6A to 6D and 7A to 7D, O represents an audio beat, and FIG. 6B is entirely the same as FIG. 6A.

As described above, the degradation of the high-frequency band component can be prevented by simply raising the high-frequency component of a reproduced RF signal, but instead, S/N is degraded and beat is built up in the high-frequency band, disturbing the image plane.

SUMMARY OF THE INVENTION

An object of the present invention is to provide an apparatus for reducing noise in a high-frequency band which is capable of reducing noise of a reproduced FM signal in its high-frequency band.

Another object of the present invention is to provide a method by which noise of a reproduced FM signal can be reduced in its high-frequency band.

Still another object of the present invention is to provide an apparatus and a method which can prevent degradation of the high-frequency component of a reproduced RF signal obtained from an optical video disc player, and degradation of S/N and buildup of beat in the high-frequency band as well.

An apparatus for reducing noise in the high-frequency band according to the present invention comprises a high-frequency band correcting device for lowering a high-frequency band component of a reproduced FM signal, and a limiter for limiting an output signal of the high-frequency band correcting device in amplitude.

In the apparatus for reducing noise in the high-frequency band, before an RF signal is inputted to the limiter, its high-frequency component is lowered, reducing noise and beat components. As a result, influences of the noise and beat are reduced so that a signal of good S/N can be obtained.

According to another aspect of the present invention, the apparatus for reducing noise in the high-frequency band further comprises a duty correcting device. The duty correcting device corrects duty of an output signal of the limiter such that it does not contain any DC component. This prevents generation of a double wave in the output signal of the limiter.

According to still another aspect of the present invention, the apparatus for reducing noise in the high-frequency band comprises an FM detector for FM-detecting the output signal of the limiter, a low-pass filter for passing a predetermined low-frequency component contained in an output signal of the FM detector, and a deemphasis device for attenuating the high-frequency component of an output signal of the low-pass filter.

As a result, rise of the high-frequency component attributable to abnormal ratios of the carrier to the sidebands can be suppressed.

According to a further aspect of the present invention, the apparatus for reducing noise in the high-frequency band comprises a first and a second band pass filters connected between the high-frequency band correcting device and the limiter in parallel, and switches. The first band-pass filter has a first passband and the second band-pass filter has a second passband wider than the first one. The switches select one of the first and second band-pass filters, apply an output signal of the high-frequency band correcting device to the selected band-pass filter, and further apply an output signal of the selected band-pass filter to the limiter.

As a result, reproduction of the RF signal has become possible whichever it comes from, i.e. whether it is from an existing optical video disc record or a fine-pitch video disc record.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a frequency spectrum of a recorded signal of an existing video disc record.

FIGS. 6A, 6B, 6C and 6D are diagrams showing frequency spectra of the RF signals which are not corrected for the high-frequency band amplification.

FIGS. 7A, 7B, 7C and 7D are diagrams showing frequency spectra of the RF signals which are corrected for the high-frequency band amplification.

FIGS. 10A, 10B, 10C, 10D and 10E are diagrams showing frequency spectra of the RF signals obtained in the respective portions of the reproduction circuit in FIG. 8, where rise of the high-frequency band is suppressed by the deemphasis circuit.

FIGS. 11A, 11b, 11C and 11D are diagrams showing frequency spectra of the RF signals obtained in the respective portions of the reproduction circuit in FIG. 8, where rise of the high-frequency band component is not suppressed by the deemphasis circuit.

FIGS. 13A and 13B are diagrams for explaining operation of the high-frequency band correcting filter where a signal of a high-frequency has been applied.

FIGS. 14A and 14B are diagrams for explaining operation of the high-frequency band correcting filter where a signal of a low-frequency has been applied.

DESCRIPTION OF THE PREFERRED EMBODIMENTS

In the following, an embodiment of the present invention will be described in detail with reference to the accompanying drawings.

Figure 8:
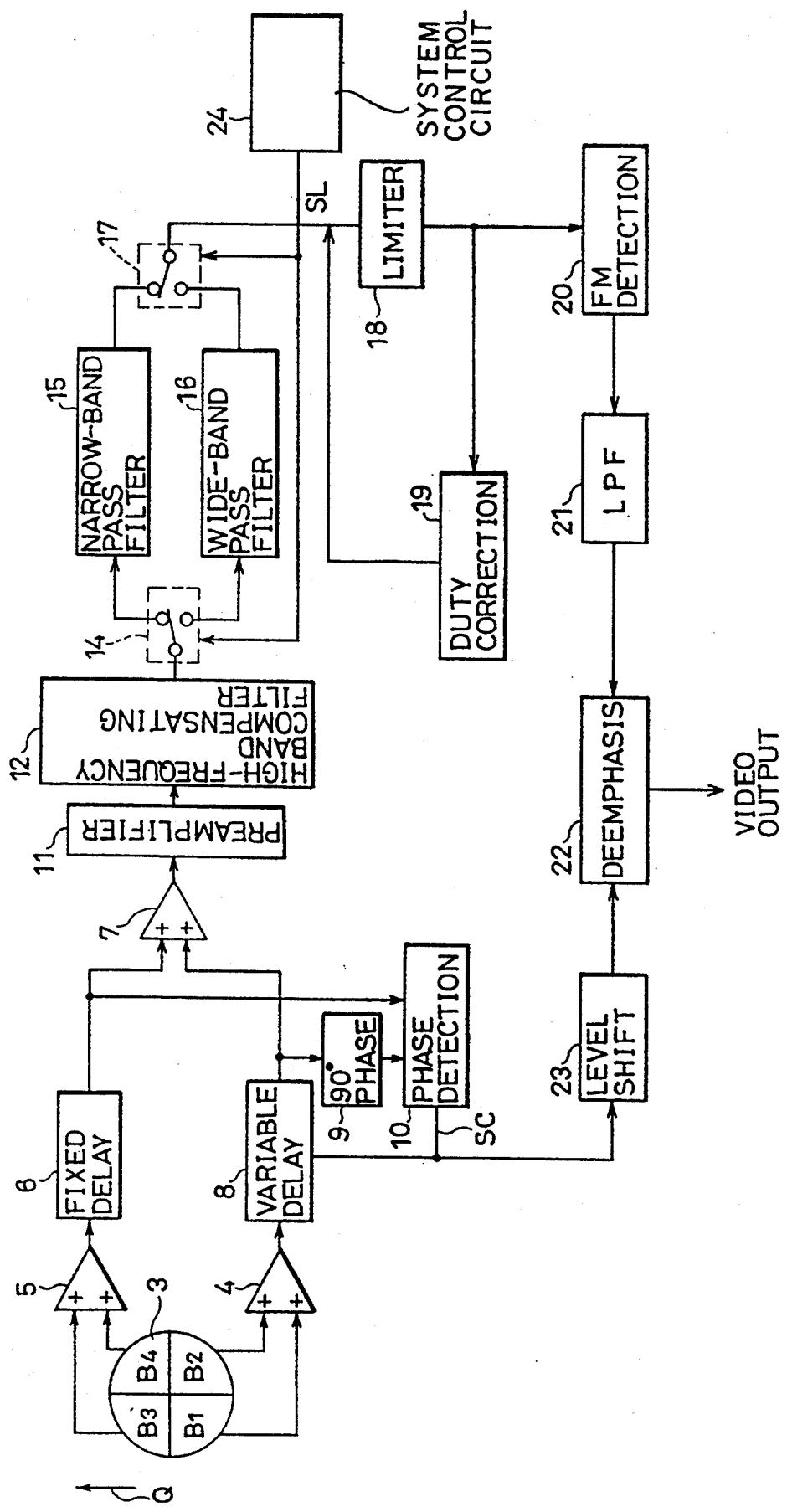
FIG. 8 is a block diagram showing an entire structure of a reproduction circuit according to an embodiment of the present invention.

FIG. 8 is a block diagram showing an entire structure of a reproduction circuit according to an embodiment of the present invention. In the diagram, a four-dividing sensor 3 constituting a pickup comprises, with respect to a tangential direction of a track on disc, or a travelling direction of pits (arrow Q), preceding photodiodes B1 and B2 and succeeding diodes B3 and B4.

Output signals which have been photoelectrically converted by the preceding photodiodes B1 and B2 are entered into an adder 4 to be added together. Output signals which have been photoelectrically converted by the succeeding photodiodes B3 and B4 are entered into another adder 5 to be added together.

An output signal of the adder 5 is delayed by a fixed delaying circuit 6 only by a certain predetermined delay time t1 before entered into an adder 7. An output signal of the adder 4 is delayed by a variable delaying circuit 8 only by a delay time T before entered into the adder 7. Those output signals are added together by th adder 7 to be outputted as a reproduced RF signal.

Further, the output signal which has been delayed by the variable delaying circuit 8 is shifted in phase by 90° in advance by a 90° phase shifter 9. The 90° phase shifter 9 is generally used to compare two signals of the same frequency in phase. An output signal of the 90° phase shifter 9 is compared in phase with the output signal of the fixed delaying circuit 6 by a phase detector 10. An output signal of the phase detector 10 is negatively fed back to the variable delaying circuit 8 as a control signal SC corresponding to a phase difference between those output signals.

The delay time T of the variable delaying circuit 8 varies in response to the control signal SC and is controlled in such a manner that the phase difference is always 0, or the output signals of both the delaying circuits 6 and 8 have just the same phase.

Figure 9:
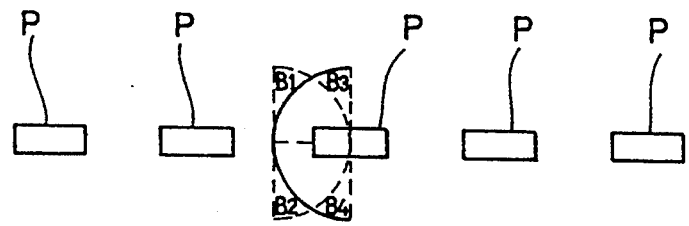
FIG. 9 is a diagram showing relationship between beam spots and pits according to the embodiment of FIG. 8.

As a result, in view of electrical signal processing, a positional relationship between beam spots and pits will be as shown in FIG. 9, where P represents a pit. A beam spot portion electrically detected by the preceding photodiodes B1 and B2 overlaps another beam spot portion electrically detected by the succeeding photodiodes B3 and B4, so that the beam spot diameters are equivalently reduced by half. As a result, resolution of the signal detection and frequency characteristics of the detected RF signal will be enhanced.

Meanwhile, the fixed delaying circuit 6 has been added for rectifying shift of control limits caused due to a minimum delay amount of the variable delaying circuit 8. Without using this fixed delaying circuit 6, however, the delay time T of the variable delaying circuit 8 may be controlled in such a manner that the output signal of the variable delaying circuit 8 and that of the adder 5 have just the same phase.

The reproduced RF signal outputted from the adder 7 is supplied to a high-frequency band correcting filter or high-frequency band correcting means 12 through a preamplifier 11. A reproduced RF signal having the frequency distribution shown in FIG. 10A will be corrected to have its high-frequency band component attenuated as shown in FIG. 10B, by passing through the high-frequency band correcting filter 12.

Meanwhile, FIG. 10A shows, like FIGS. 6A and 7A, a frequency distribution where the high-frequency band component of a reproduced RF signal has been deteriorated so that an upper sideband component H has become smaller than a lower sideband component L.

The reproduced RF signal whose high-frequency band component has been attenuated by the high-frequency band correcting filter 12 passes through a narrow-band pass filter (BPF) 15 or a wide-band pass filter (BPF) 16 by way of a switch 14 to be further entered into a limiter 18 in the subsequent stage through a switch 17.

Figure 2A:
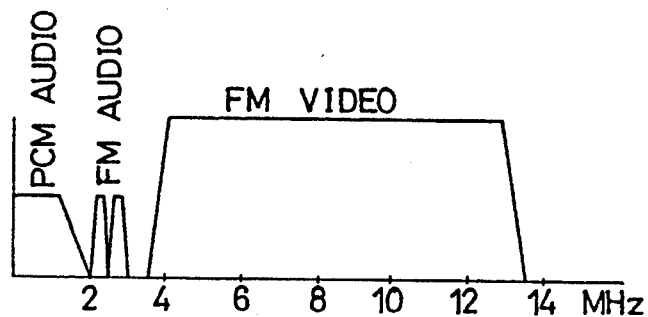
FIG. 2A is a diagram for explaining frequency distribution of a recorded signal of an existing video disc record.
Figure 2B:
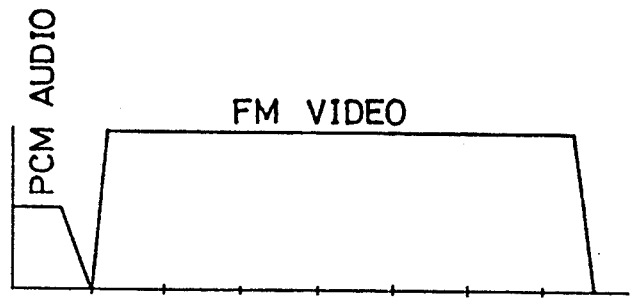
FIGS. 2B, 2C and 2D are diagrams for explaining frequency distribution of recorded signals of a fine-pitch video disc record.
Figure 2C:
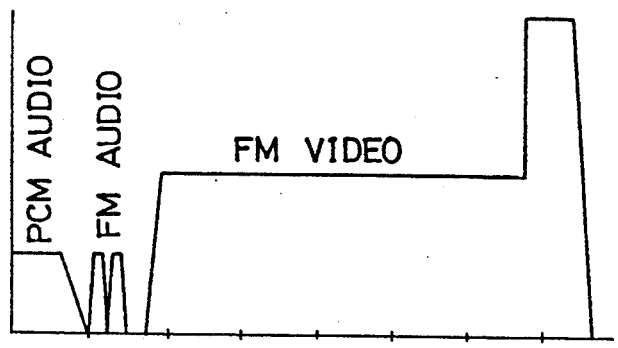
Figure 2D:
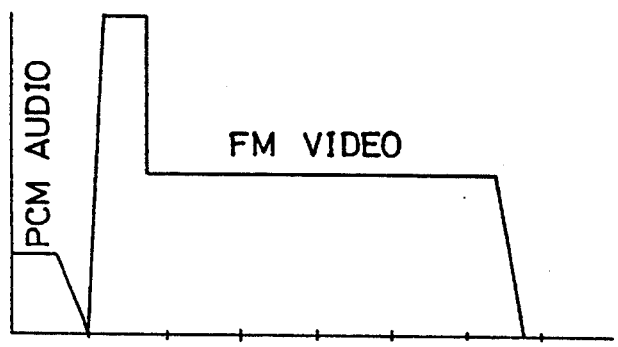
Figure 3:
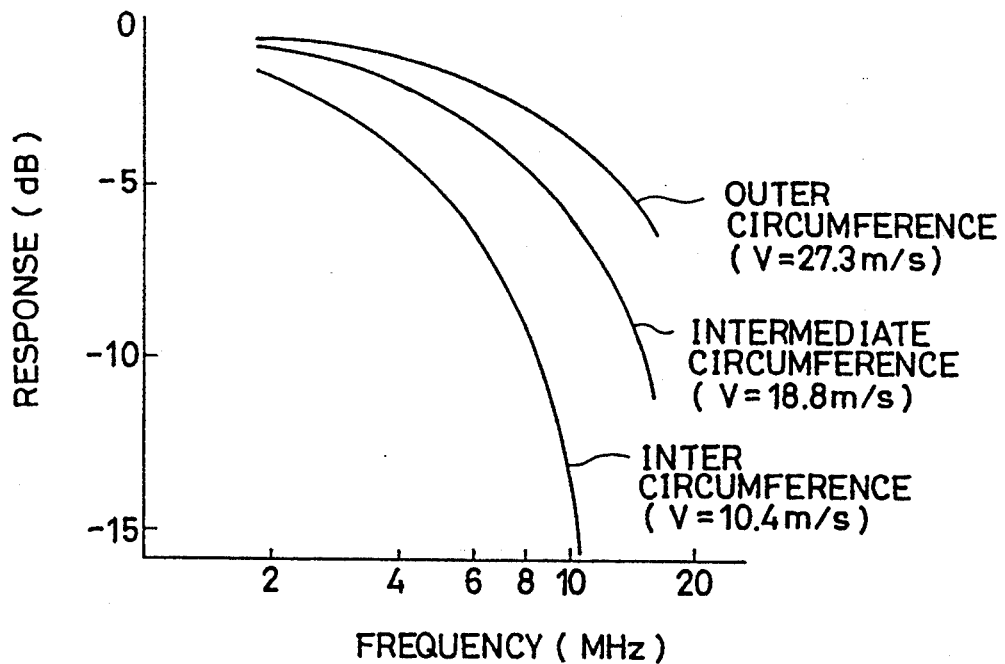
FIG. 3 is a diagram showing frequency characteristics of a reproduced signal from a conventional CAV disc.
Figure 4:
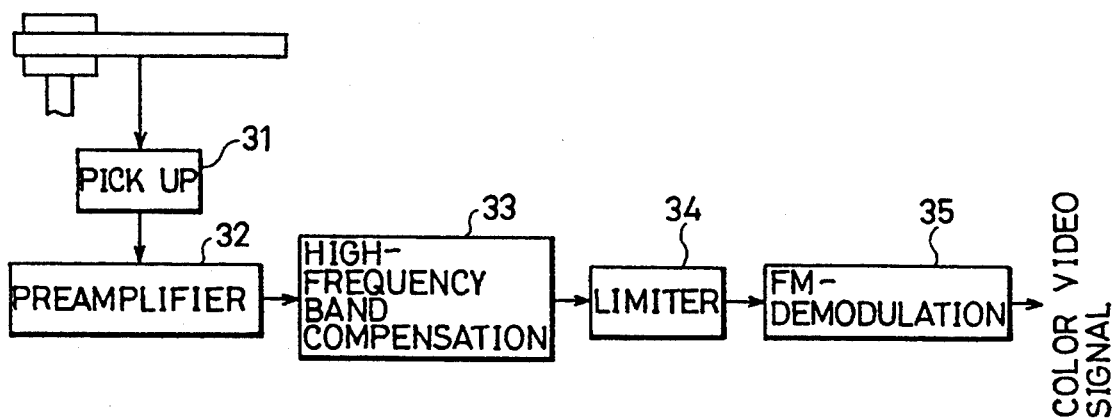
FIG. 4 is a block diagram showing a structure of a conventional video disc reproduction system.
Figure 5:
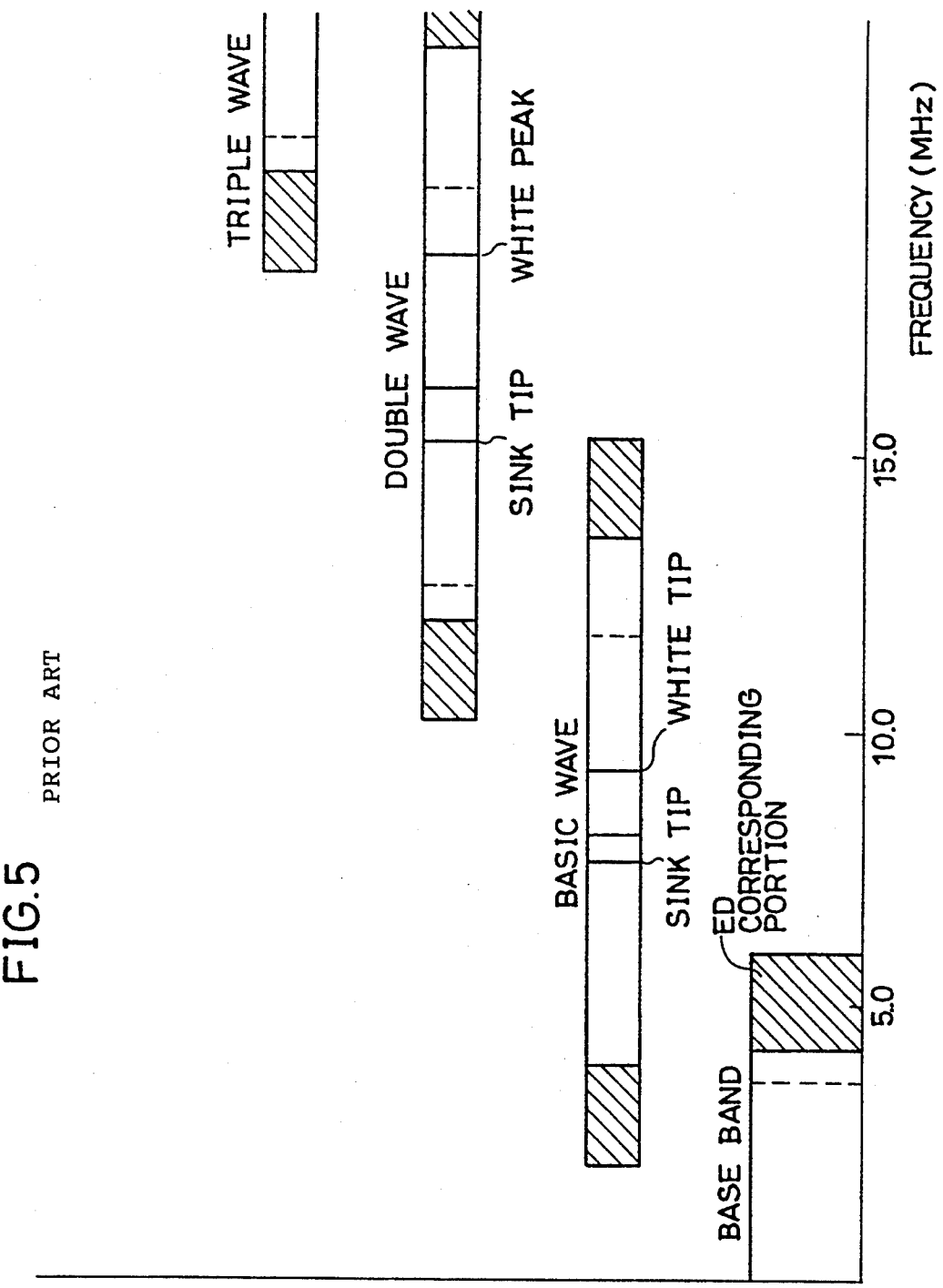
FIG. 5 is a diagram for explaining a double wave and a triple wave which are generated in reproduction of a conventional video disc record.

The narrow-band BPF 15 is used to extract RF signals from an existing optical video disc record (referred to as LD hereinafter) that have the frequency spectrum shown in FIG. 2A. On the other hand, the wide-band BPF 16 is used to extract reproduced RF signals from a fine-pitch video disc record (referred to as EDLD hereinafter) that have the frequency spectrum shown in FIG. 2B. The switches 14 and 17 are switched in synchronization with an EDLD/LD switch signal SL supplied from a system control circuit 24. When an LD is to be reproduced, the reproduced RF signal is entered into the narrow-band BPF 15 and the switches 14 and 17 are switched so as to supply the output signal of the narrow-band BPF 15 to the limiter 18. Meanwhile, when an EDLD is to be reproduced, the reproduced RF signal is entered into the wide-band BPF 16 and the switches 14 and 17 are switched so as to supply the output signal of the wide-band BPF 16 to the limiter 18.

The reproduced RF signal applied from the switch 17 will be corrected to have its high-frequency band attenuated, as shown in FIG. 10B. When the reproduced RF signal shown in FIG. 10B passes through the limiter 18, the double wave W and the beat Y which have been seen only in the high-frequency band are averaged and reduced to be symmetrical on the upper and lower sides with respect to the carrier C as a central axis. At the same time, the upper-side band component H and the lower-side band component L are averaged as required and then outputted.

An output signal of the limiter 18 is entered into a duty correcting circuit 19 and an FM detecting circuit 20. The limiter 18 outputs a pair of signals having opposite polarities. If duty of the limiter 18 itself is deviated, a double wave appears in the output signal of the limiter 18, diminishing the effects of reducing noise in the high-frequency band of the reproduced RF signal. The deviation in duty of the limiter 18 allows a DC component to be superimposed on the output signal of the limiter 18. Therefore, the duty correcting circuit 19 compares magnitudes of the DC components contained in the signals of opposite polarities that have been outputted from the limiter 18 and controls DC potential entered in the limiter 18 such that potential difference between those DC components is eliminated. As a result, the deviation in duty of the output signal from the limiter 18 is eliminated, suppressing generation of the double wave.

The output signal of the limiter 18 is FM-detected by the FM-detecting circuit 20, passed through a low-pass filter (LPF) 21 to be FM-demodulated into a video signal of baseband, and then outputted. Meanwhile, cut-off frequency of the LPF 21 is set to allow passage of only the video signal of baseband. Therefore, the output signal of the limiter 18 having the frequency distribution shown in FIG. 10C is reduced to the video signal of baseband shown in FIG. 10D.

Meanwhile, in the reproduced RF signal shown in FIG. 10A, the carrier component is also somewhat deteriorated under influences of the degradation of the high-frequency band. On the other hand, since the lower sideband component L hardly suffers from the degradation, the output signal of the limiter 18 has abnormal ratios in level of the carrier C to the upper and the lower sideband components H and L, as shown in FIG. 10C. As a result, the high-frequency band component of the FM-detected output signal is raised as shown in FIG. 10D. Therefore, in FIG. 10C, the carrier component diminishes a little under some influences of the degradation of the high-frequency band as described above and this causes levels of the sidebands to become too high with respect to that of the carrier.

For this reason, it becomes necessary to suppress the rise of high-frequency band which has been caused by such abnormal carrier/sidebands ratios, with the use of a deemphasis circuit 22 in the subsequent stage.

A level shift circuit 23 is responsive to the control signal SC outputted from the phase detector 10 for generating an output signal having a voltage value adequate to control the deemphasis circuit 22. The voltage value of this output signal becomes higher as that of the control signal SC is lower. In other words, the voltage value of the output signal becomes higher as the delay time T of the variable delaying circuit 8 is smaller, and conversely, it becomes lower as the same is larger. With the CAV disc, for example, since the linear velocity changes depending on a radial direction of the disc, delay amount of the output signals of the following photodiodes B3 and B4 which is determined with those of the preceding photodiodes B1 and B2 as reference, or phase difference between those output signals changes depending on a radial position of the disc. Therefore, in the inner circumference of the CAV disc, the phase difference between the signals outputted from the delaying circuits 6 and 8 becomes larger than that obtained from the outer circumference and correspondingly, voltage value of the control signal SC also becomes larger.

As a result, in the inner circumference where degradation of the high-frequency band in the RF stage is evident, the attenuation of the high-frequency band by the deemphasis circuit 22 becomes larger than that in the outer circumference. Therefore, the FM demodulated output signal whose high-frequency band component has been raised by the high-frequency band correcting filter 12, as shown in FIG. 10D, is passed through the deemphasis circuit 22 and then, as shown in FIG. 10E, has the high-frequency band attenuated by only the same amount that has been raised by the high-frequency band correction. Correspondingly, the double wave W and the beat Y are further lowered, suppressing influences thereof.

Now, another case will be discussed where there is less degradation of the high-frequency band of a reproduced RF signal as in the outer circumference of the CAV disc. For example, when there can be seen no degradation of the high-frequency band of the reproduced RF signal as shown in FIG. 11A, the output signals of the high-frequency band correcting filter 12 and the limiter 18 will be as shown in FIGS. 11B and 11C. In FIG. 11C, the component of double wave W which has been seen only in the high-frequency band is averaged to be symmetrical on the upper and lower sides with respect to the carrier C as a central axis and thus outputted.

When the output signal of the limiter 18 is FM-detected, the beat which has been seen only in the high-frequency band is reduced as shown in FIG. 11D. Furthermore, the upper and lower side band components L and H of the output signal of the limiter 18 have levels equal to average levels of those of the reproduced RF signal that has undergone the high-frequency band correction, which are therefore lower than those of the reproduced RF signal shown in FIG. 11A only by the amount of high-frequency band attenuation. On the other hand, level of the carrier C is also lowered under influences of the high-frequency band correction. Therefore, the ratios in level of the carrier C to the upper and lower sidebands in the output signal of the limiter 18 remains unchanged when compared with those in the reproduced RF signal that has not undergone the high-frequency band correction yet. As a result, the level ratios hold normal values without having to be corrected by the deemphasis circuit 22.

Therefore, where the degradation of the high-frequency band does not easily appear in the reproduced RF signal, or in reproducing the outer circumference of the CAV disc, voltage value of the control signal SC becomes low and then that of the output signal of the level shift circuit 23 becomes high. As a result, the correction by the deemphasis circuit 22 is suppressed to a small amount, so that the output signal of the deemphasis circuit 22 will be substantially identical to the FM-detected output signal shown in FIG. 10D.

Subsequently, a structure of the high-frequency band correcting filter 12 will be described with reference to FIG. 12.

The high-frequency band correcting filter 12 comprises a delay path constituted of transistors Tr1 and Tr4 and a delay line 13, and a through path constituted of transistors Tr2 and Tr3. The reproduced RF signal is applied to the delay line 13 through the transistor Tr1 there to be delayed, and then outputted to the emitter of the transistor Tr4. At the same time, the reproduced RF signal is outputted through the transistors Tr2 and Tr3 without any processing, and then added to the signal outputted to the emitter of the transistor Tr4. In other words, the reproduced RF signal which has been delayed only by a predetermined delay time t2 through the delay path is added to the reproduced RF signal obtained through the through path without any processing. Meanwhile, there is interposed a condenser C7 so as to eliminate a DC component.

As shown in FIG. 13A, when the reproduced RF signal has a high frequency, the addition of the undelayed reproduced RF signal (indicated by broken line) and the reproduced RF signal having been delayed only by the predetermined delay time t2 (indicated by solid line) will eliminate such a frequency component as shown in FIG. 13B.

On the other hand, as shown in FIG. 14A, when the reproduced RF signal has a low frequency, an output signal obtained through the addition of the undelayed reproduced RF signal and the delayed reproduced RF signal will be as shown in FIG. 14B. In this manner, the high-frequency band correcting filter 12 functions to attenuate only the high-frequency band component of the reproduced RF signal according to the set delay time t2 of the delay line 13.

Figure 15A:
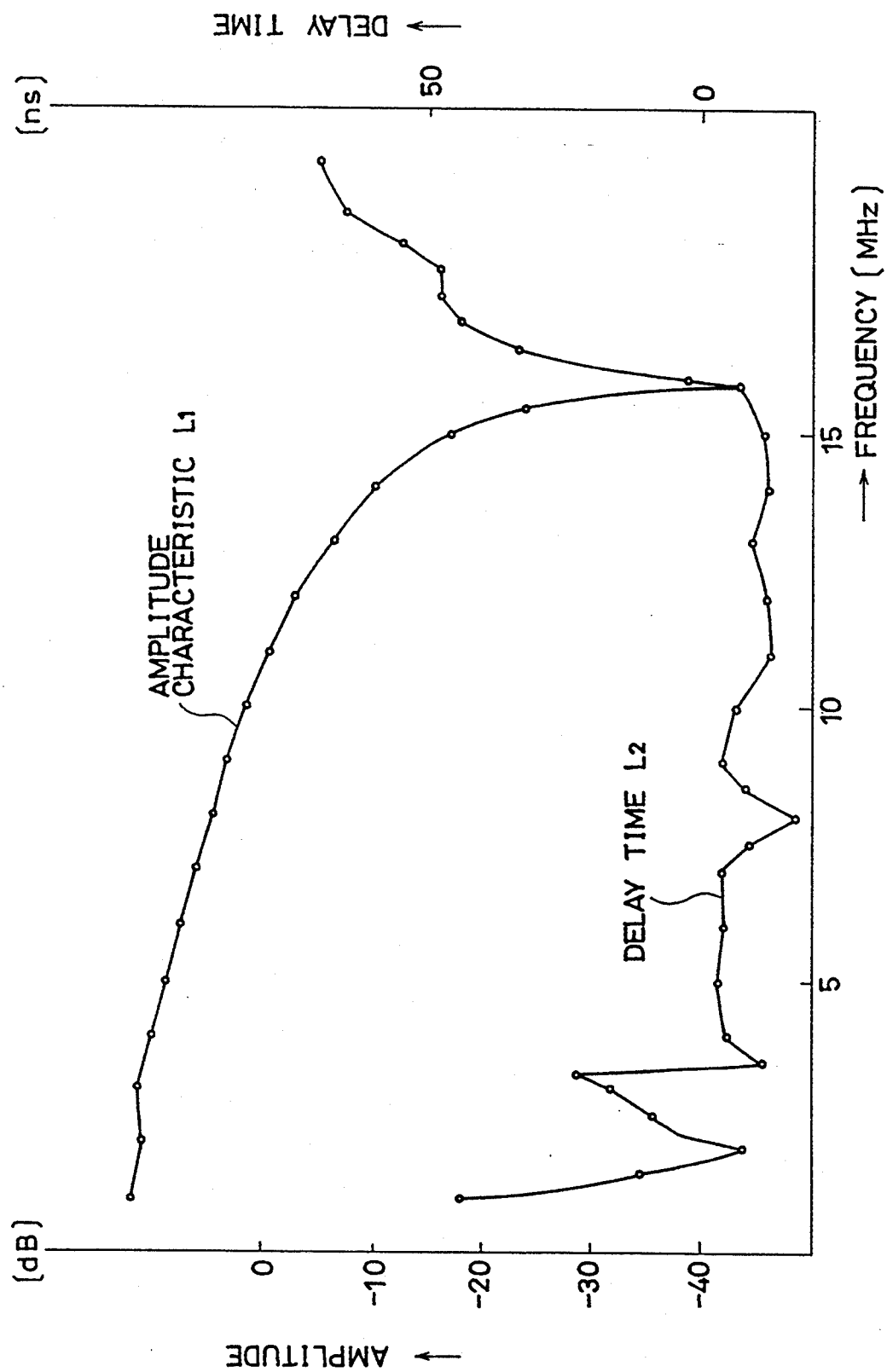
FIG. 15A is a diagram showing frequency characteristics and group delay characteristic of the high-frequency band correcting filter.
Figure 15B:
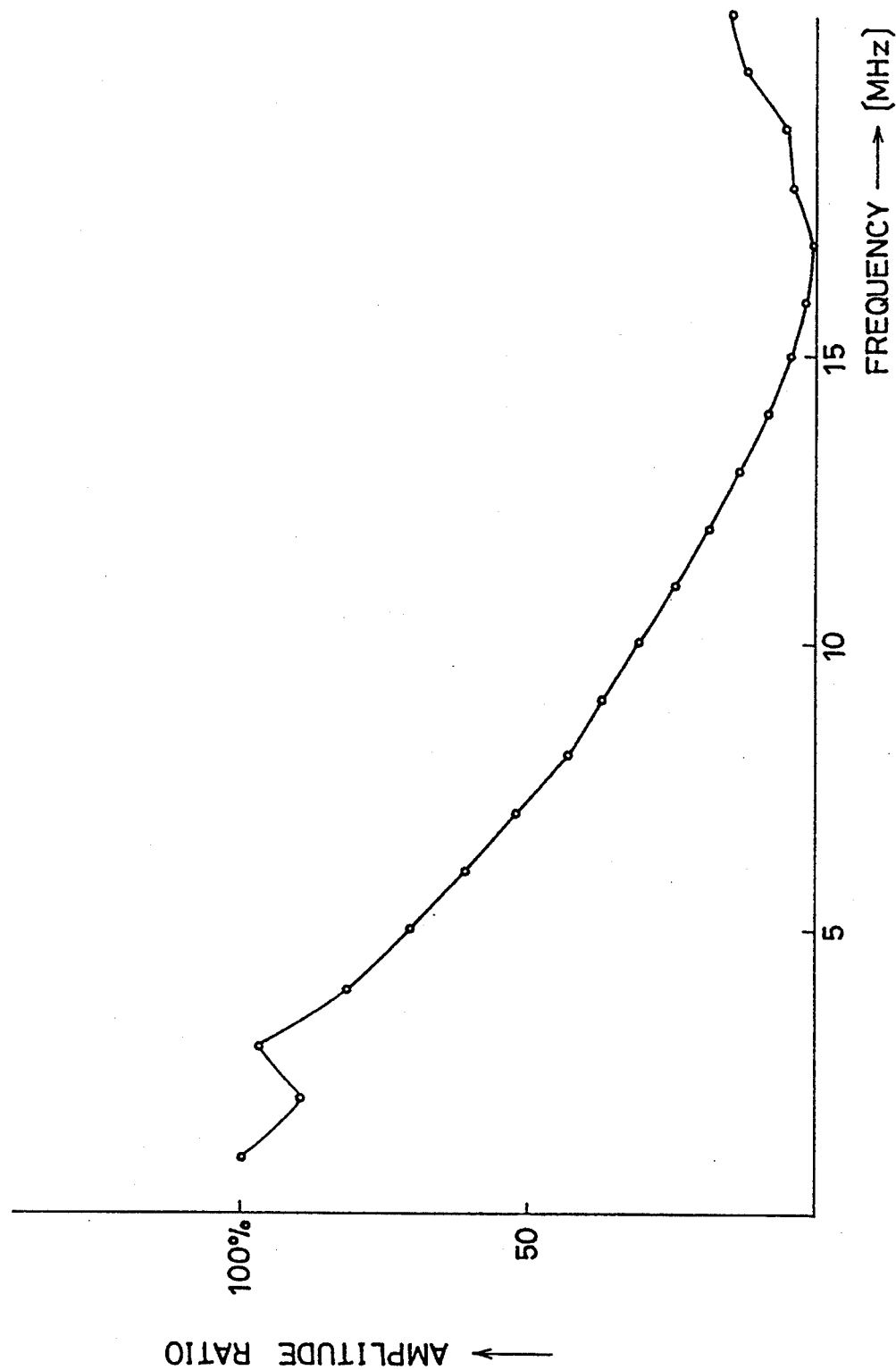
FIG. 15B is a diagram showing amplitude characteristic of the high-frequency band correcting filter, where the vertical line represents antilogarithm ratio.

For example, if the delay time is set as t2 = 32 to 35 nsec, the amplitude characteristic shown in FIGS. 15A and 15B can be obtained. Therefore, the high-frequency correcting filter 12 is used for frequencies up to about 16 MHz as a filter in which the reproduced RF signal attenuates further in amplitude in a higher-frequency band.

Meanwhile, in FIG. 15A, L1 shows amplitude characteristic with the vertical line being represented in terms of decibel (dB), and L2 shows group delay characteristic dependent on frequency.

Figure 12:
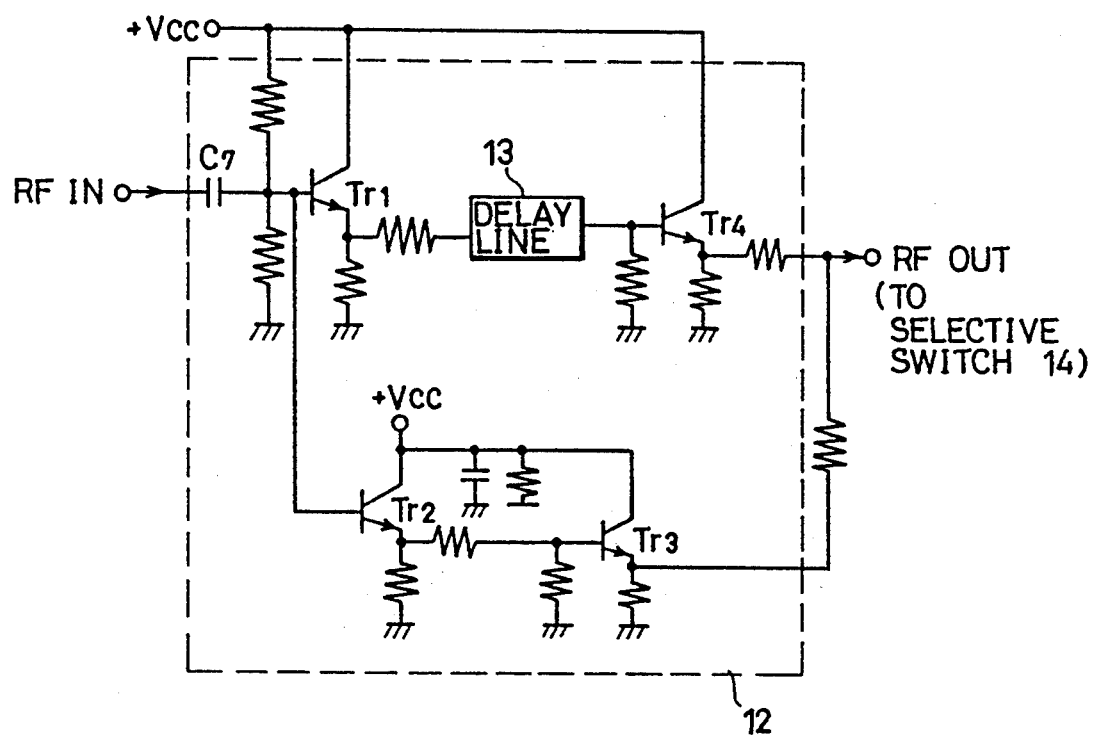
FIG. 12 is a specific circuit diagram of a high-frequency band correcting filter.

As another method of attenuating only the high-frequency band component of a reproduced RF signal, an LPF may be simply used as the high-frequency band correcting filter instead of the complicated structure shown in FIG. 12.

Figure 16:
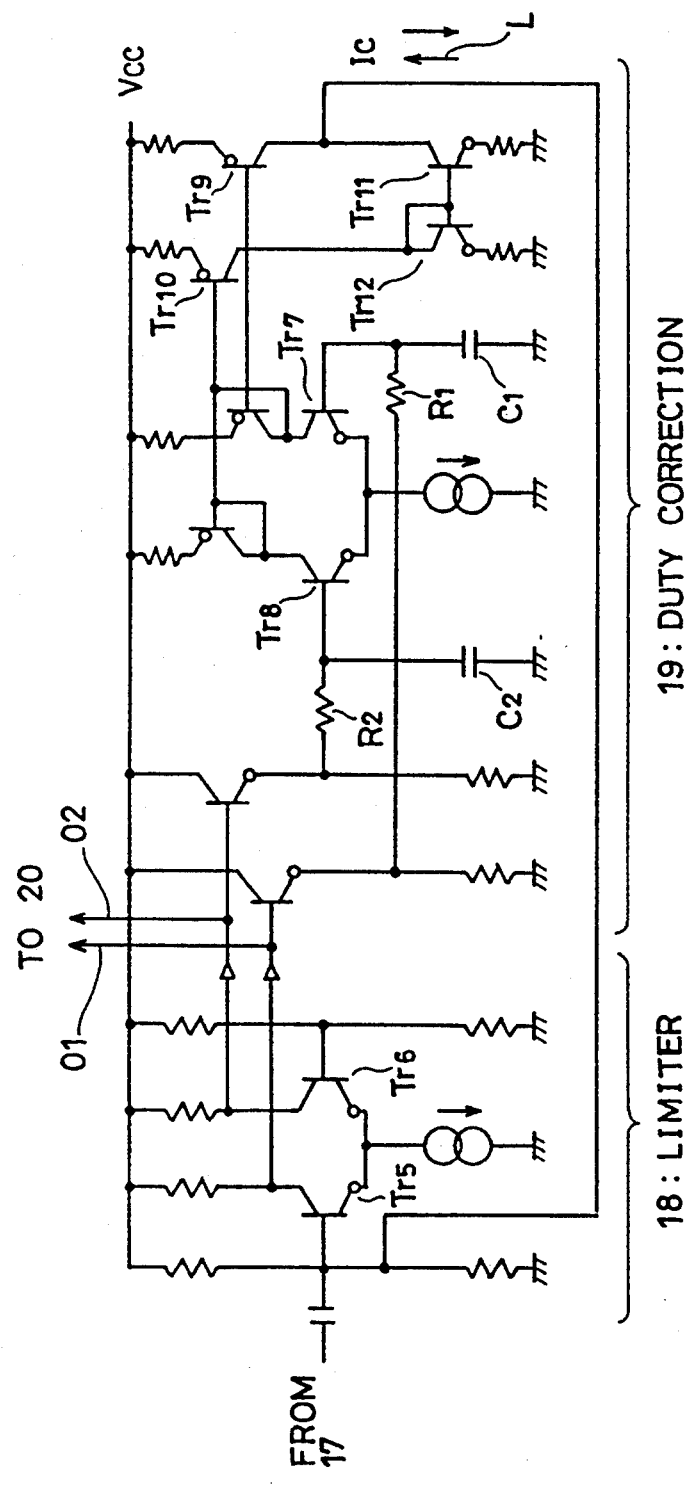
FIG. 16 is a specific circuit diagram of a limiter and a duty correcting circuit.

Subsequently, a specific structure of the limiter 18 and the duty correcting circuit 19 will be described with reference to FIG. 16.

The limiter 18 comprises transistors Tr5 and Tr6 constituting a differential amplifier. When base potentials of the transistors Tr5 and Tr6 are different from each other, duties of output signals 01 and 02 of the limiter 18 become different. Thus, these output signals 01 and 02 are passed through a low-pass filter comprised of a resistor R1 and a capacitor C1, and a low-pass filter comprised of a resistor R2 and a capacitor C2 so as to extract only DC components. These DC components are compared by transistors Tr7 and Tr8. Control is then performed by feeding back current IC to an input portion such that potentials of those DC components become equal to each other, or the output signals 01 and 02 have a duty of 50%.

For example, when the base potential of the transistor Tr5 is larger than that of the transistor Tr6, the base potential of the transistor Tr8 becomes larger than that of the transistor Tr7. This causes collector current of the transistor Tr8 to become larger than that of the transistor Tr7. As a result, a control current Ic flows in the direction of arrow L by way of a current mirror circuit comprised of transistors Tr9 to Tr12 so as to reduce the base potential of the transistor Tr5.

In this manner, duty of the output signal of the limiter 18 is corrected.

Subsequently, a specific structure of the deemphasis circuit 22 will be described with reference to FIG. 17.

Figure 17:
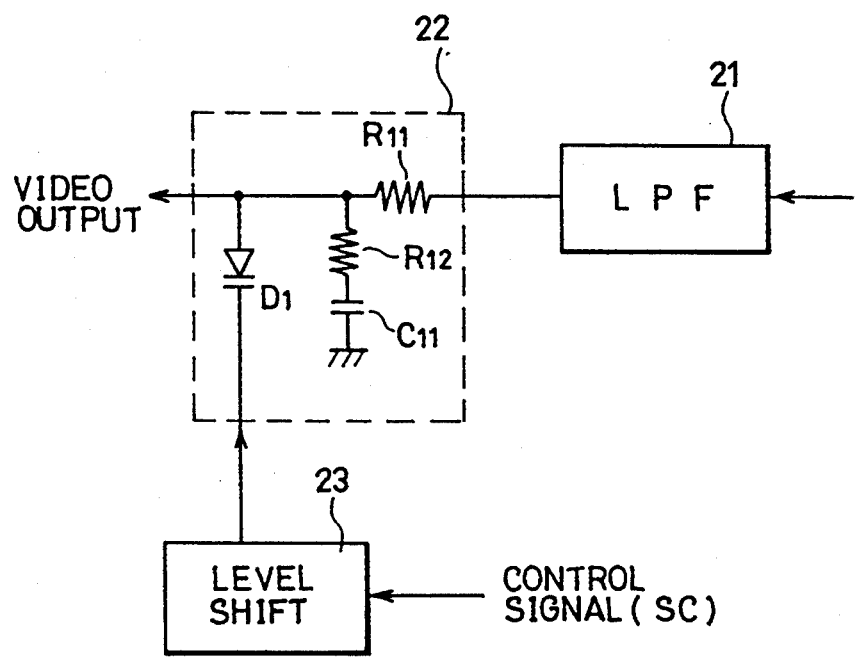
FIG. 17 is largely a specific circuit diagram of a deemphasis circuit.

As shown in FIG. 17, the deemphasis circuit 22 is a kind of LPF comprising a variable capacitance diode D1, resistors R11 and R12, and a condenser C11. In this deemphasis circuit 22, characteristic as an LPF, or the attenuation characteristic of the high-frequency band component varies subtly depending on sum of capacitance values of the condenser C11 and the valuable capacitance diode D1, and resistance values of the resistors R11 and R12.

An output voltage from the level shift circuit 23 is applied to the cathode side of the variable capacitance diode D1. The thus applied voltage of opposite direction causes electrostatic capacitance of the variable capacitance diode D1 to change. As a result, amount of the attenuation of the high-frequency band by the deemphasis circuit 22 is controlled.

In reproducing the inner circumference of the CAV disc or the full circumference of the CLV disc, the phase difference between the signals outputted from the delaying circuits 6 and 8 (see FIG. 8) becomes large, increasing voltage value of the control signal SC. This causes voltage value of the output signal of the level shift circuit 23 to decrease. As a result, the voltage of opposite direction of the variable capacitance diode D1 becomes small and conversely, electrostatic capacitance of this variable capacitance diode D1 becomes large. Therefore, amount of the attenuation of the high-frequency band caused by the deemphasis circuit 22 serving as an LPF becomes larger only by the increased amount of electrostatic capacitance of the variable capacitance diode D1. Accordingly, in reproducing the inner circumference of the CAV disc and the full circumference of the CLV disc, the high-frequency band is attenuated by the deemphasis circuit 22 by a further increased amount.

On the other hand, in reproducing the outer circumference of the CAV disc, the phase difference between the signals outputted from the delaying circuits 6 and 8 (see FIG. 8) becomes small, decreasing voltage value of the control signal SC. This causes voltage value of the output signal of the level shift circuit 23 to increase. As a result, the voltage of opposite direction of the variable capacitance diode D1 becomes large and conversely, electrostatic capacitance of the same becomes small. Therefore, amount of the attenuation of the high-frequency band caused by the deemphasis circuit 22 serving as an LPF is reduced by the decreased amount of electrostatic capacitance of the variable capacitance diode D1. As a result, in reproducing the outer circumference of the CAV disc, the attenuation of the high-frequency band caused by the deemphasis circuit 22 is suppressed to a small degree.

Meanwhile, in the embodiment above, if characteristic of the high-frequency band correcting filter 12 inclines lineally (antilogarithm ratio) in the band, degradation of DG (Differential Gain) and DP (Differential Phase) will not occur.

As has been described in the foregoing, according to the present invention, it becomes possible to suppress degradation of S/N and buildup of beat in the high-frequency band while preventing degradation of the high-frequency band of a reproduced RF signal. Therefore, reproduction of a fine-pitch disc having video signals recorded thereon with their frequency bands expanded becomes fully possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for reducing noise of a reproduced FM signal in a high-frequency band, comprising:
   high-frequency band correcting means for lowering a high-frequency band component of said reproduced FM signal so that a level of an upper side band component is suppressed in comparison with a level of a lower side band component in said reproduced FM signal;
   limiter means for limiting an output signal of said high-frequency band correcting means in amplitude;
   first and second band-pass filter means provided between said high-frequency band correcting means and said limiter means in parallel, said first band-pass filter means having a first pass-band, and said second band-pass filter means having a second pass-band wider than said first pass-band; and
   switch means for selecting one of said first and second band-pass filter means, applying an output signal of said high-frequency band correcting means to the selected band-pass filter means, and applying an output signal of the selected band-pass filter means to said limiter means.

2. An apparatus for reducing noise of a reproduced FM signal in a high-frequency band, comprising:
   high-frequency band correcting means for lowering a high-frequency band component of said reproduced FM signal so that a level of an upper side band component is suppressed in comparison with a level of a lower side band component in said reproduced FM signal;
   limiter means for limiting an output signal of said high-frequency band correcting means in amplitude;
   converting means for converting a light beam from an optical record medium, which has signals recorded thereon in pits constituting a track, into an electrical signal, said converting means comprising first photoelectrical converting means provided on a preceding side with respect to a reproducing direction of said track, and second photoelectrical converting means provided on a succeeding side;
   delaying means for delaying an output signal of said first photoelectrical converting means, delay time of said delaying means being variable;
   time difference detecting means for detecting time difference between an output signal of said second photoelectrical means and an output signal of said delaying means to output a signal corresponding to the detected time difference;
   said delaying means being responsive to said signal outputted from said time difference detecting means for having said delay time changed;
   FM-detecting means for detecting an FM output signal of said limiter means;
   low-pass filter means for passing a low-frequency band component of an output signal of said FM-detecting means;
   deemphasis means for attenuating a high-frequency band component of an output signal of said low-pass filter means; and
   control means responsive to said signal outputted from said time difference detecting means for controlling an amount of attenuation of the high-frequency band component by said deemphasis means.

3. A reproducing apparatus for reproducing an optical record medium which has signals recorded thereon in pits constituting a track, comprising:
   converting means for converting a light beam from said optical record medium into an electrical signal, said converting means comprising first photoelectrical converting means provided on a preceding side with respect to a reproducing direction of said track, and second photoelectrical converting means provided on a succeeding side;
   delaying means for delaying an output signal of said first photoelectrical converting means, delay time of said delaying means being variable;
   time difference detecting means for detecting time difference between an output signal of said second photoelectrical means and an output signal of said delaying means to output a signal corresponding to said detected time difference;
   said delaying means being responsive to said output signal of said time difference detecting means for having said delay time changed;
   adding means for adding the output signal of said delaying means and the output signal of said second photoelectrical converting means;
   high-frequency band correcting means for lowering a high-frequency band component of an output signal of said adding means;
   limiter means for limiting an output signal of said high-frequency band correcting means in amplitude;
   FM-detecting means for detecting an FM output signal of said limiter means;
   low-pass filter means for passing a low-frequency band component of an output signal of said FM-detecting means;
   deemphasis means for attenuating a high-frequency band component of an output signal of said low-pass filter means; and
   control means responsive to said output signal of said time difference detecting means for controlling amount of attenuation of a high-frequency band component by said deemphasis means.

4. A reproducing apparatus for reproducing an optical record medium which has signals recorded thereon in pits constituting a track, comprising:
   converting means for converting a light beam from said optical record medium into an electrical signal, said converting means comprising first photoelectrical converting means provided on a preceding side with respect to a reproducing direction of said track, and second photoelectrical converting means provided on a succeeding side;
   delaying means for delaying an output signal of said first photoelectrical converting means, delay time of said delaying means being variable;
   time difference detecting means for detecting time difference between an output signal of said second photoelectrical means and an output signal of said delaying means to output a signal corresponding to said detected time difference;

said delaying means being responsive to said output signal of said time difference detecting means for having said delay time changed;

adding means for adding the output signal of said delaying means and the output signal of said second photoelectrical converting means;

high-frequency band correcting means for lowering high-frequency band component of an output signal of said adding means;

limiter means for limiting an output signal of said high-frequency band correcting means in amplitude;

FM-detecting means for detecting an FM output signal of said limiter means;

low-pass filter means for passing a low-frequency band component of an output signal of said FM-detecting means;

deemphasis means for attenuating a high-frequency band component of an output signal of said low-pass filter means; and control means responsive to said output signal of said time difference detecting means for controlling amount of attenuation of a high-frequency band component by said deemphasis means;

first and second band-pass filter means provided between said high-frequency band correcting means and said limiter means in parallel, said first band-pass filter means having a first pass-band, and said second band-pass filter means having a second pass-band wider than said first pass-band; and switch means for selecting one of said first and second band-pass filter means, applying an output signal of said high-frequency band correcting means to the selected band-pass filter means, and applying an output signal of the selected band-pass filter means to said limiter means.

5. The reproducing apparatus according to claim 4, further comprising:

duty correcting means for correcting an output signal of said limiter means in duty so as not to contain any DC component.

* * * * *